(No Model.) 2 Sheets—Sheet 1.
M. G. HUBBARD.
CAR TRUCK.
No. 312,720. Patented Feb. 24, 1885.
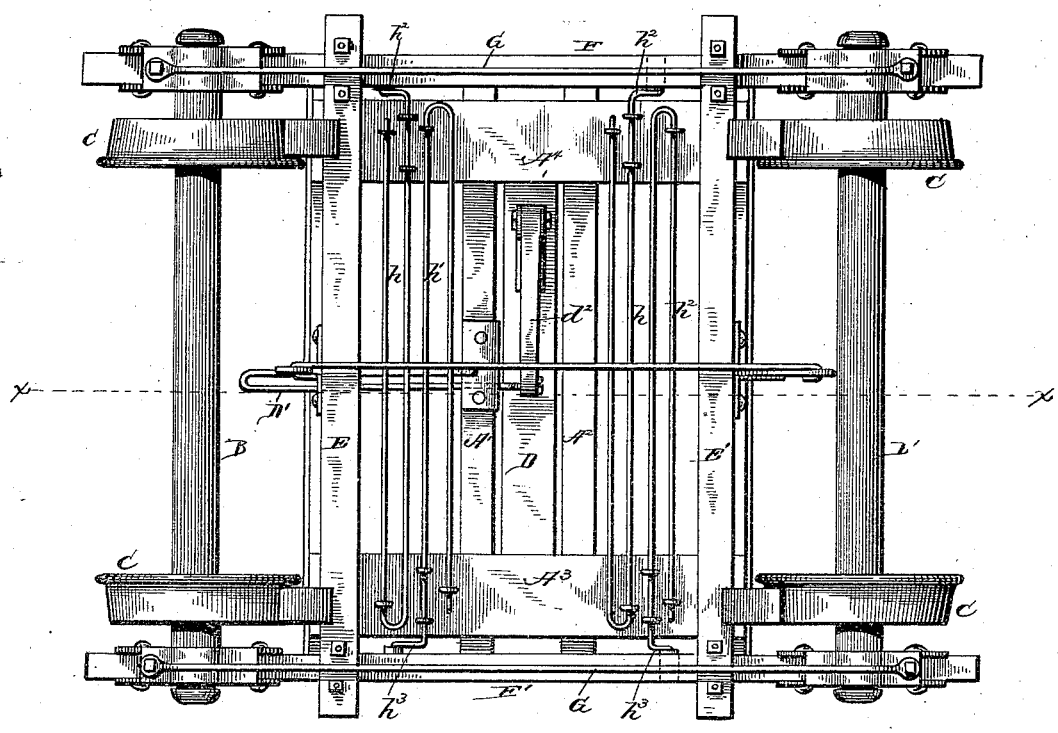
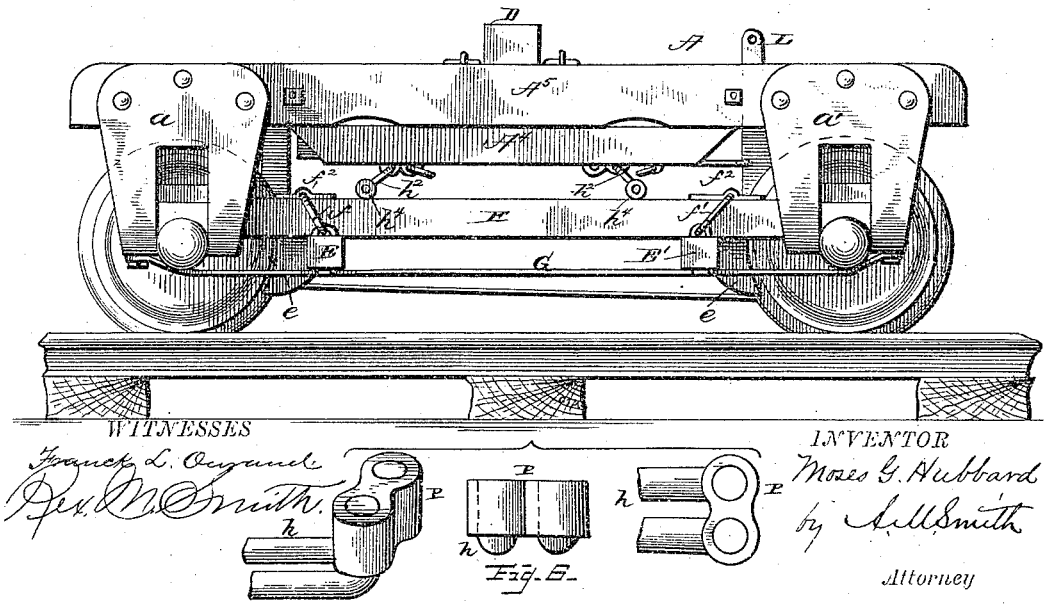
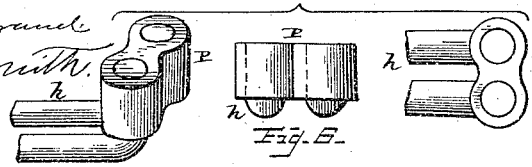
WITNESSES
INVENTOR
Moses G. Hubbard
by A. M. Smith
Attorney

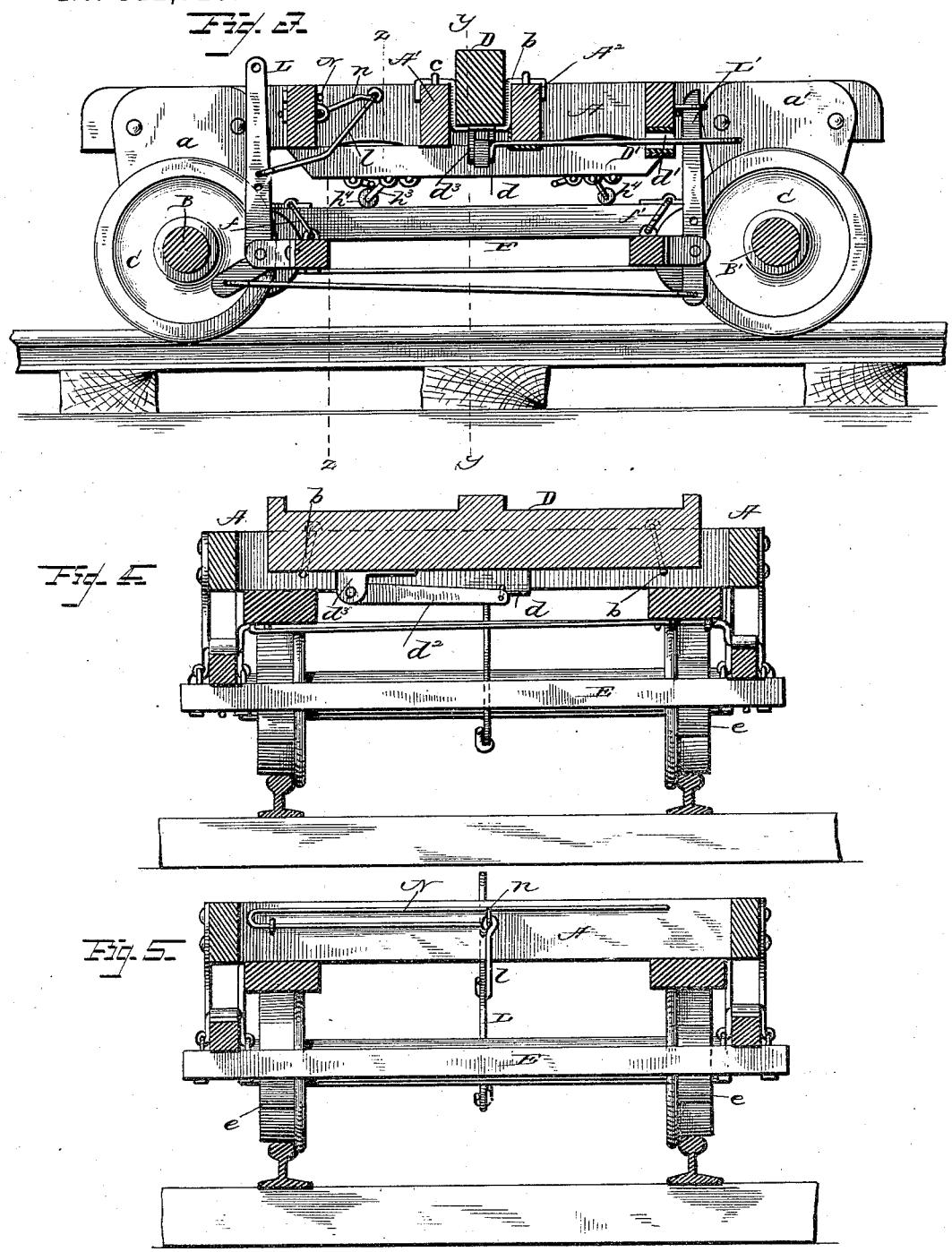

UNITED STATES PATENT OFFICE.

MOSES G. HUBBARD, OF NORRISTOWN, PENNSYLVANIA.

CAR-TRUCK.

SPECIFICATION forming part of Letters Patent No. 312,720, dated February 24, 1885.

Application filed April 12, 1884. (No model.)

*To all whom it may concern:*

Be it known that I, MOSES G. HUBBARD, of Norristown, in the county of Montgomery and State of Pennsylvania, have invented new and useful Improvements in Car-Trucks, of which the following is a full, clear, and exact description, reference being had to the accompanying drawings, making part of this specification.
My invention relates to the means for suspending the bolster from the frame of the truck, and for checking or relieving endwise movement or play thereof or the lateral movement of the car-body, and for preventing undue swaying or jarring of the latter in passing around short curves or over uneven surfaces; to the connecting of the brakes with equalizing-bars in such manner as to make their movements independent of those of the truck, and to hold them always in proper working relation to the yielding wheels of the truck; to the means for suspending the brake-bars from the equalizing-bars, and to an arrangement of torsion-springs for supporting the body of the truck upon the equalizing-bars, and for retracting the brakes after they have been brought to bear on the wheels; to the means for bracing the axle-brackets and preventing displacement of the brake-bars in the event of their becoming accidentally detached, and in certain details of construction and arrangement hereinafter described.

In the accompanying drawings, Figure 1 is a bottom view of a car-truck with my improvements applied. Fig. 2 is a side elevation of the same. Fig. 3 represents a longitudinal section taken on the line $x$ $x$, Fig. 1. Figs. 4 and 5 are transverse sections taken on the lines $y$ $y$ and $z$ $z$, respectively, of Fig. 3; and Fig. 6 is a detail view showing a modification in the construction of the heavy torsion-rods.

The truck in the construction of its framework and in its general organization or arrangement of parts, and except in particulars hereinafter specifically pointed out, may be similar to those in use, and need not therefore be described further than is necessary to an understanding of my improvements.

A represents the frame or body of the truck, provided at its ends with pendent slotted brackets $a$ $a'$, permitting its vibration on the axles B and B', upon which the wheels C are secured in any usual manner.

D represents the bolster upon which, in practice, the car-body rests, and to which said body may be secured in any usual manner. This bolster is suspended between the transverse bars A' A² of the truck-frame upon pendent U-shaped links $b$, having horizontal arms or pivots on their open upper ends, which are secured in eye-bearings $c$ on the upper faces of bars A' and A², as shown in Fig. 3. These links or pendent loops in their normal position incline outward from their bearings $c$ toward the ends of the bolster, as shown in dotted lines, Fig. 4, and the connecting-bars of their loop or closed ends pass through eye-bearings on the lower face of the bolster, this arrangement of the suspending loops or links tending to resist and to limit the longitudinal movement of the bolster or its lateral movement relatively to the car-truck. For further resisting this lateral swaying of the bolster I connect it at or near the center of its length with a short crank-arm, $d$, formed on one end of a strong recurved torsion rod or spring, D', the other end of said rod returning to and being secured in bar A' or other suitable part of the frame A. The loop portion of this recurved rod passes through an eye, $d'$, which prevents its displacement without interfering with the torsional action of the rod throughout its entire length. The crank $d$ stands normally in a vertical position at right angles to the lower face of the bolster, and its pin or wrist is connected by a stout link, $d^2$, with the lower face of said bolster, being pivoted in a pendent bracket, $d^3$, as shown. This arrangement permits the lateral vibration of the crank under the action of the bolster and its load from its vertical position to one approximating an angle of ninety degrees thereto on either side, in which latter position it would be upon its dead-center relative to the pull or thrust upon it, and its farther movement and that of the bolster and of the load upon it would necessarily cease. The crank, as will readily be seen, will approach its dead-centers referred to under a constantly-increasing resistance from the torsion-rod, and with its leverage power for acting on the latter rapidly diminishing; and it serves by its action to gently and gradually check the lateral or endwise movement of the bolster, avoiding all sudden and disagreeable jarring action. The inclination of the suspending-links $b$, as described, tends to lift the end of the bolster moving outward under the action of a curve or of a depression in or of the track upon that side, an action which would throw more of the weight of the load upon the springs on that side of the truck depressing them, and thus serving to preserve the bolster in a horizontal position, and thereby prevent swaying of the car-body. The bolster may be connected with the torsion-spring crank-arm in any suitable manner that will permit the action of the latter as described. The brake-shoes $e$ are connected to transverse bars E and E' in any usual manner, and the latter are suspended between the wheels by U-shaped links or loops $f\ f'$ from longitudinal equalizing-bars F F', which extend from axle to axle, and are provided at their ends with the upper half boxes for said axles, the lower half boxes being formed in the pendent slotted brackets $a$. The brackets $a$ are slotted longitudinally of the truck, as well as transversely, the axles passing through the transverse slots, and the bars F and F' through the longitudinal slots, above the ends of the axle, as shown; and the links $f$ and $f'$, which suspend the brake-bars E and E', have their loop portion secured in pivotal bearings at $f^2$ on the bars F, with their pendent arms or open ends set inclining inward, and connected by ring bolts or eyes with the bars E, as shown. The lower ends of the brackets $a$ and $a'$ are connected by strong tie rods or braces G, which serve to materially stiffen and strengthen them, and, passing as they do underneath the brake-bars E and E', they serve to prevent the falling or displacement of the latter should they become accidentally disconnected from their suspending-links $f$ and $f'$. The inward inclination of the links $f$ and $f'$ is assumed when the brakes are out of action, the application of the brakes by the swinging of the bars outward toward the wheels causing the links to approximate a vertical position. By passing the equalizing-bars F and F' through the longitudinal slot of the axle-brackets, as explained, they are held in uniform relation laterally to the car-truck frame, and, resting with their half-boxes on the axle, they maintain a fixed relation thereto and to the wheels under any and all relative vertical movements of the said frame, thereby holding the brake-bars always in proper relation to the wheels for adapting the brake to act with certainty and uniformly on the wheels. The weight of the truck-frame and its load is thrown upon the equalizing-bars F and F' by means of interposed springs $h\ h$ and $h'\ h'$, arranged in pairs, and consisting of heavy torsion-rods arranged transversely of the truck-frame, and recurved upon themselves at $i$ for giving the rods of the size and strength required the desired elasticity. They may be recurved as many times as is necessary for this purpose, and have each one end rigidly secured in or to longitudinal frame-timbers $A^3$ and $A^4$, with the parallel portions secured to said timbers by suitable bearings, $k\ k$, so arranged as not to interfere with torsional action of the rod throughout its entire length. The longitudinal bars $A^3$ and $A^4$ referred to extend under the ends of the bolster, and form a safety arrangement for catching and supporting the latter in case the links sustaining it should become detached or broken, and they form a convenient point for the attachment of the torsion-rods $h\ h'$; but the latter may be otherwise arranged, if preferred. The outer or free ends of these rods have short crank-arms $h^2\ h^3$ formed upon them, upon the wrist-pins of which are mounted friction-rollers $h^4$, which rest and roll, as the crank-arms yield, on the bars F and F'. The arms $h^2\ h^3$ are by preference set inclining outward and downward from their pivotal centers (the torsion-rods or the portion thereof on which they are formed) and each toward its supporting-wheel, as giving greater steadiness of support to the frame A and its load than any other arrangement. The weight of the load under the arrangement described and shown will thus be thrown upon the crank-arms of the torsion-rods, and through these upon the equalizing-bars F and F', and thence upon the axles, thereby holding the bars F F' firmly down on the axles, however much the main truck-frame may rise or fall relatively thereto. Space is allowed or provided between the equalizing-bars F and F' and the longitudinal frame-bars $A^5$, immediately above them, to permit the crank-arms to swing upward into or to approximate an upright or vertical position, in which they would be upon their dead-centers relatively to the action of the load, and which they would approach under a constantly-increasing resistance from the torsion-rods and a rapidly-diminishing leverage of the crank-arms, such as would greatly check the descent of the load and effectually prevent jar, in a manner that will be readily understood. The crank-arms of the torsion-rods may be connected with the equalizing-bars by short pivoted links of sufficient length merely to permit the lateral vibration of the crank-arms, instead of through the friction-rollers, if preferred.

Brake-bar levers of the usual form are employed for actuating the brakes and causing them to act with equal pressure on the wheels. These levers are seen at L and L' in the sectional view, Fig. 3, both pivoted to brackets on the brake-bars, the upper end of L' passing upward through a guiding-loop, $m$, on one of the transverse frame-bars, said loop serving to form a fulcrum for lever L' without interfering with the vertical movement of the frame under the action of its load. The arm or lever L, which in practice is the one with which the hand-wheel or other brake-actuating device is connected, has a link, $l$, pivoted to it near the center of its length, the opposite end of said link being connected with an arm, $n$, on a torsion-rod, N, which is similar in form to the other torsion-rods above described. The torsion-spring N serves to retract the lever L, and through it the brakes after they have been applied and are released, and may be made to hold the brakes removed from the wheels with any required force. The arrangement of the crank-arm on the torsion-spring for retracting the brakes is such as to exert its greatest leverage on the spring when the brakes are applied, and it can therefore be held by the brake-actuating mechanism with comparative ease, while, as it recedes in retracting the brakes, it shortens, relatively, by approaching its dead-center, and so, being less easily removed, holds the brakes away from the wheels with the required power, notwithstanding the reduced torsional strain on the rod N; and the arrangement of the links $f$ and $f'$, as described, causes the brake-bars to be swung upward by the action of the spring N against the equalizing-bars, where they will be held by the spring with sufficient force to prevent any rattling.

In the manufacture of these large recurved springs great care is required to form the curves perfectly and in such manner as to avoid fracturing the steel, as any considerable imperfection in the form or organization of the steel at any part of its entire length is fatal; and where the machinery for recurving is not sufficiently enlarged and perfected for this purpose this difficulty can be avoided in the following manner: The steel being cut into sections corresponding with the desired length of the complete spring, the ends are heated and very carefully bent at right angles by a curved bend, forming a short arm at each end of the bar, as shown in Fig. 6. The loop or recurve is then made by placing two of these ends in a cast malleable-iron socket-coupling, P. This coupling may be made in one piece, having the two sockets of suitable size to be driven on tightly; or it may be made in two halves, like an ordinary journal-box, and either riveted or bolted together in such manner as to unite the two bars firmly. In this manner a looped or recurved end is cheaply and conveniently formed of great strength, and a complete spring of exactly uniform strength throughout its entire length may thus be made having all of the merits of the most perfectly-bent loops or recurvatures.

Having now described my invention, I claim as new—

1. In a car-truck, the swinging bolster hung upon links inclined outward at their lower ends, in combination with the truck-frame supported by recurved torsion-springs upon equalizing-bars, substantially as described.

2. In a car-truck, the bolster hung upon outwardly-inclined links, in combination with the truck-springs resting upon the equalizing-bars outside of the truck-wheels, substantially as described.

3. The combination, with the truck-frame, bolster, and crank-arm, of the supporting-links, inclined outward, for regulating the lateral movement of the car-body, substantially as described.

4. In a car-truck, the bolster suspended on links, in combination with the crank-arm and spring connected therewith, substantially as described.

5. The combination, with the car-truck, of the long horizontal recurved torsion rods or bars, and the equalizing-bars connecting the two axles, for the purpose, and substantially as described.

6. The torsion-springs, in combination with short crank arms or levers the ends of which are supported by the equalizing-bars connecting the two axles, substantially as described.

7. In a car-truck, the torsion rods or springs provided with crank-arms having friction-rollers on their free ends, in combination with the equalizing-bars mounted upon the axles, substantially as described.

8. In a car-truck, the torsion-springs provided with crank arms or levers inclining outward and downward each toward the wheel directly upholding it, and supported on the equalizing-bars connecting the axles, substantially as described.

9. In a railroad car-truck, the elongated torsion rods or springs composed of similar longitudinal sections united by metallic socket-couplings, substantially in the manner specified and shown.

10. The brake-bars, in combination with links connecting them with and suspending them from the equalizing-bars, substantially as described.

11. The combination, with the brake-bars, of the torsion rod or spring and its crank-arm, arranged to operate in the manner substantially as and for the purpose described.

12. The combination of the brake-bar spring with the brake-bar links, for holding the brake-bar up against the equalizing-bar when the brakes are not in action, substantially as described.

13. The combination of the brake-bars with the equalizing-bars connecting the truck-axles, and the connecting-links suspending said brake-bars from the equalizing-bars, whereby they are adapted to operate in the manner substantially as described.

14. The combination, with the truck of the equalizing-bars and the brake-bars suspended therefrom, substantially as described, whereby the action of the brakes is made independent of the truck-frame and its supporting-spring.

15. The combination, with the truck-frame and the equalizing-bars connecting the axles, of the brake-bars, and the safety-bars extending beneath said brake-bars and joining the axle-brackets, substantially as specified.

16. The combination, with the truck-frame and the bolster suspended thereon, of the safety-bars attached to the truck-frame underneath the bolster, substantially as described.

In testimony whereof I have hereunto set my hand this 8th day of April, A. D. 1884.

MOSES G. HUBBARD.

Witnesses:
GEO. N. HEAVNER,
JAS. W. SCHRACK.